(12) United States Patent
Choi (10) Patent No.: US 12,530,002 B2
(45) Date of Patent: Jan. 20, 2026

(54) DIGITAL TWIN PLATFORM PROVISION SYSTEM FOR DETECTING AND RESPONDING TO FIRE IN INSTALLATION REGION OF ELECTRICAL EQUIPMENT IN NUCLEAR POWER PLANT

(71) Applicant: KFUBIS. CO., LTD., Seoul (KR)

(72) Inventor: Doo Chan Choi, Seoul (KR)

(73) Assignee: KFUBIS. CO., LTD., Seoul (KR)

( * ) Notice: Subject to any disclaimer, the term of this patent is extended or adjusted under 35 U.S.C. 154(b) by 330 days.

(21) Appl. No.: 18/513,926

(22) Filed: Nov. 20, 2023

(65) Prior Publication Data
US 2025/0140427 A1 May 1, 2025

(30) Foreign Application Priority Data
Oct. 31, 2023 (KR) .......................... 10-2023-0147500

(51) Int. Cl.
*G08B 21/00* (2006.01)
*G05B 13/04* (2006.01)
*G06F 30/13* (2020.01)
*G08B 17/00* (2006.01)

(52) U.S. Cl.
CPC .............. *G05B 13/04* (2013.01); *G06F 30/13* (2020.01); *G08B 17/00* (2013.01)

(58) Field of Classification Search
CPC .......... G05B 13/04; G06F 30/13; G08B 17/00
USPC ......................................................... 340/500
See application file for complete search history.

(56) References Cited

U.S. PATENT DOCUMENTS

| | | | |
|---|---|---|---|
| 2023/0368651 A1* | 11/2023 | Cho | G08B 29/188 |
| 2024/0046001 A1* | 2/2024 | Brandl | G06Q 10/10 |
| 2024/0412622 A1* | 12/2024 | Cho | G08B 31/00 |

FOREIGN PATENT DOCUMENTS

| | | | | |
|---|---|---|---|---|
| KR | 2016116987 A | * | 10/2016 | ......... A62C 99/0081 |
| KR | 101769880 B1 | * | 8/2017 | ......... A62C 99/0081 |
| KR | 20220130489 A | * | 9/2022 | ............ G06Q 50/10 |

\* cited by examiner

*Primary Examiner* — Mark S Rushing

(57) ABSTRACT

Disclosed is a digital twin platform provision system for detecting and responding to a fire in an installation region of electrical equipment in a nuclear power plant, which includes: a digital twin build unit for building an initial digital twin by digitally modeling target objects including equipment and subsidiary materials related to fire outbreak and damage spread; an attribute information application unit for applying fire reactivity information received from an outside and serves as attribute information about fire outbreak and spread factors to the initial digital twin, thereby building a digital twin; and a simulation information provision unit for generating simulation information, which is information about fire outbreak prediction, fire spread simulation upon fire break, and fire response and evacuation scenarios upon the fire break, by using the digital twin according to a user input and outputting the simulation information to a user terminal.

5 Claims, 9 Drawing Sheets

DIGITAL TWIN PLATFORM PROVISION SYSTEM FOR DETECTING AND RESPONDING TO FIRE IN INSTALLATION REGION OF ELECTRICAL EQUIPMENT IN NUCLEAR POWER PLANT

BACKGROUND OF THE INVENTION

1. Field of the Invention

The present invention relates to a technology capable of establishing situation control, evacuation solution, and fire disaster prevention scenarios by using a digital twin in which a user is provided with simulation information about scenarios for detecting and suppressing a fire to prepare for a situation of a fire occurring at a place installed with electrical equipment within a nuclear power plant, thereby facilitating operations of a protection system and the like within the nuclear power plant, and providing the user with simulation information about scenarios for fire response and evacuation, so as to enable the user or administrator to effectively detect the fire upon the electrical equipment in the nuclear power plant, and quickly extinguish and respond to the fire.

2. Description of the Related Art

Since a nuclear power plant has a high possibility of causing a major accident in the event of a fire, fire suppression equipment is required. Particularly, in order to minimize damage from the fire, it is considered an important factor to establish a system capable of performing a simulation in advance to prepare for a fire occurring at a place installed with electrical equipment therein. Further, because a fire prediction, which is prior to the fire by providing information about facility deterioration, fire possibility and the like to prevent the fire in advance in addition to evacuation design after the fire, is a way to prevent greater damage, various technologies for minimizing fire damage have been developed in relation to the fire prediction.

As an example, Korean Patent Registration No. 10-1893850 (FIRE SIMULATION APPARATUS OF MAIN CONTROL ROOM IN NUCLEAR POWER PLANT AND LEARNING METHOD OF CIRCUMSTANCE CONDITION THEREOF) discloses a technology for providing a simulation apparatus for evaluating an operator's responding ability under similar situations to prepare for a fire occurring in a main control room of a nuclear power plant.

However, in the above-mentioned related art, fire situations are merely simulated within a simulation environment created by configuring internal spaces in which actual situations are simply simulated, and a technology, which is configured to build a digital twin by digitally modeling objects related to fire outbreak and damage spread within a nuclear power plant and then applying attribute information thereto and by generating simulation information according to a user input and outputting the generated simulation information to a user terminal, is not disclosed. Thus, the need for a technology for solve the above problem is emerging.

SUMMARY OF THE INVENTION

The present invention is designed to solve the above problems in the related art, and particularly, an object of the present invention is to provide a technology for providing a technology capable of supplying detection and response to fire outbreak specialized for a place installed with electrical equipment inside a nuclear power plant and simulation information about evacuation scenarios, so as to use a digital twin platform, thereby quickly detecting a fire upon fire outbreak in a region installed with the electrical equipment within the nuclear power plant, and preparing appropriate response actions correspondingly.

A digital twin platform provision system for detecting and responding to a fire in an installation region of electrical equipment in a nuclear power plant and the digital twin platform provision system is implemented by a computing device including one or more processors and one or more memories for storing instructions executable in the processors according to one embodiment of the present invention and digital twin build unit for building an initial digital twin by digitally modeling target objects which are objects including equipment and subsidiary materials related to fire outbreak and damage spread in a place installed with the electrical equipment in the nuclear power plant; an attribute information application unit for applying fire reactivity information, which is information received from an outside and serves as attribute information about a fire outbreak factor and a fire spread factor of the target object, to the initial digital twin, thereby building a digital twin; and a simulation information provision unit for generating simulation information, which is information about fire outbreak prediction, fire spread simulation upon the fire break, and fire response and evacuation scenarios upon the fire break, by using the digital twin according to a user input and outputting the simulation information to a user terminal.

The target object may include electrical equipment, an electric line, a subsidiary material containing a flammable substance, and other subsidiary materials installed in relevant locations and affected by the fire.

The simulation information provision unit may establish a fire outbreak prediction algorithm for deriving a predicted value for whether a fire occurs in a region based on a result of combining a plurality of sensor values, and generate a fire outbreak prediction simulation for each scenario according to the established fire outbreak prediction algorithm to output the generated fire outbreak prediction simulation to the user terminal.

The simulation information provision unit, may provide the fire reactivity information by using graphic elements, aging information about the electrical equipment, aging information about cables, corrosion information about pipes, and information about quantity and aging of storage tanks for storing each nuclear power plant water in the digital twin may be output to the user terminal as the fire reactivity information.

The system according to the present invention further includes: a disaster prevention equipment recommendation unit connected to the simulation information provision unit to recommend information about fire extinguishing equipment capable of reducing fire possibility or preventing spread when information about the fire possibility and the spread at a specific point is generated.

The simulation information provision unit, when information about the specific point is received as the user input, may provide information about the fire possibility and the fire spread according to a size of a region that may be set differently based on attribute information of a region corresponding to the received information.

The disaster prevention equipment recommendation unit may use attribute information of a selected region to recommend disaster prevention equipment that may be installed within the selected region.

The disaster prevention equipment recommendation unit may prioritize and recommend recommended installation locations in regions suitable for installing the disaster prevention equipment and sequentially close from a specific location in a region having high fire possibility.

The disaster prevention equipment recommendation unit may provide changed information about adjustment in a numerical value of the fire probability and the spread upon installation of the recommended disaster prevention equipment by comparing with existing information.

The simulation information provision unit, when the evacuation scenario information is provided upon the fire outbreak, may displays evacuation guide line information and fire extinguisher placement information prior to other information.

According to the present invention, a virtual simulation may be performed by using the digital twin platform for various situations occurring upon fire outbreak even when the situations are different from actual situations or physical models subject to the actual situations, and appropriate disaster prevention equipment may be derived based on the virtual simulation, so that a fire suppression system optimized for a nuclear power plant can be provided against a fire occurring in electrical equipment inside the nuclear power plant.

In addition, a replicated environment identical to an actual nuclear power plant may be digitally reproduced, so that various simulations can be performed safely and economically without human and material damages.

DETAILED DESCRIPTION OF THE INVENTION

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific exemplary aspects among one or more aspects. However, the aspects are merely exemplary and some of various ways among principles of the various aspects may be employed, and the descriptions set forth herein are intended to include all the various aspects and equivalents thereof.

The term "embodiment", "example", "aspect", "exemplification" or the like as used herein may not be construed in that an aspect or design set forth herein is preferable or advantageous than other aspects or designs.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various elements, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, unless defined otherwise in embodiments of the present invention, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in an embodiment of the present invention.

Figure 1:
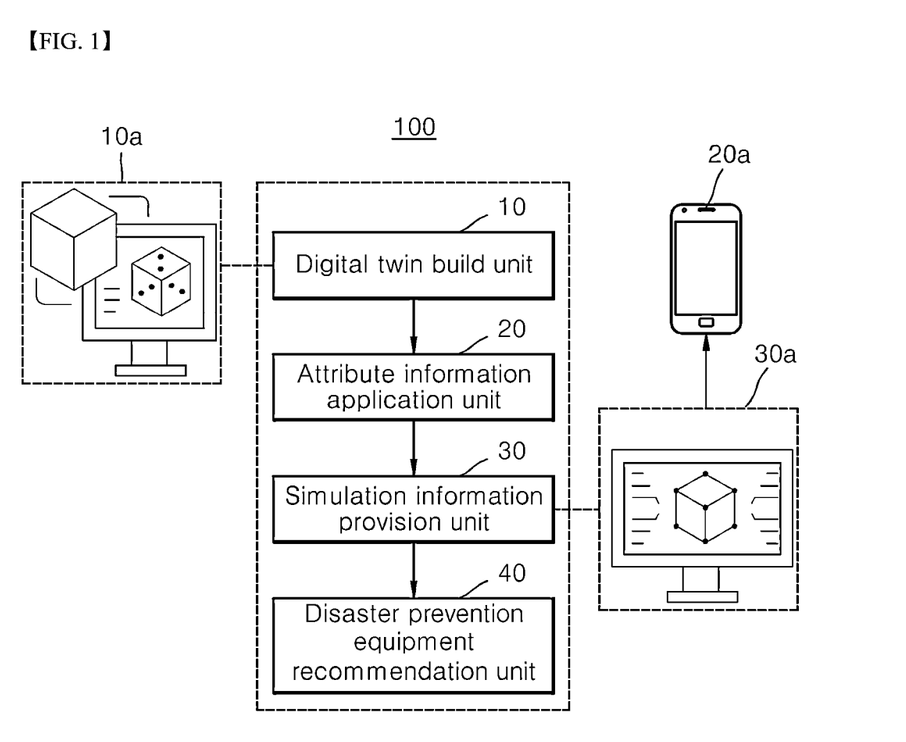
FIG. 1 is a configuration diagram of a digital twin platform provision system for detecting and responding to a fire in an installation region of electrical equipment in a nuclear power plant according to one embodiment of the present invention.

FIG. 1 is a block diagram for explaining a digital twin platform provision system for detecting and responding to a fire in an installation region of electrical equipment in a nuclear power plant according to one embodiment of the present invention.

Referring to FIG. 1, a digital twin platform provision system 100, which is implemented in a computing device including at least one processor and at least one memory for storing instructions executable by the processor, for detecting and responding to a fire in an installation region of electrical equipment in a nuclear power plant (hereinafter referred to as a digital twin platform provision system) may include a digital twin build unit 10, an attribute information application unit 20 and a simulation information provision unit 30.

According to one embodiment of the present invention, the digital twin build unit 10 may build an initial digital twin 10a by digitally modeling target objects which are objects including equipment and subsidiary materials related to fire outbreak and damage spread in a place installed with electrical equipment in a nuclear power plant.

According to one embodiment of the present invention, the digital twin in the digital twin platform provision system of the present invention refers to data embodied in a virtual world inside a computer and implemented into a map of the nuclear power plant in a real world, facility information including machinery equipment or the like within electrical equipment included in the nuclear power plant, and information about the energy flow and operation of facilities. Since a status of equipment, systems or the like may be monitored in the virtual world, a timing for maintenance and repair may be identified and improved when the digital twin technology is utilized, various situations that may occur during operation can be predicted, safety can be verified or sudden accidents can be prevented to reduce a risk of the accidents, and thus the digital twin has been used in various fields.

According to one embodiment of the present invention, the above-described facility information within the electrical equipment refers to name, type, purpose, apparatus specification and latest inspection date of a facility including machinery or equipment in a place installed with the electrical equipment. The above-described information about the energy flow of the facility refers to information including the amount, type, moving direction and the like of energy generated to produce electricity at the nuclear power plant. The above-described information about the operation of the facility refers to information about facility's operating method, operating condition, operating time, and impact subject to the operating condition. The impact information refers to information indicating effects of changes in temperature, humidity and energy consumption of a facility changed according to the operation of the facility.

According to one embodiment of the present invention, the target object may include electrical equipment, an electric line, a subsidiary material containing a flammable substance, and other subsidiary materials installed in relevant locations and affected by the fire.

Accordingly, the target object may include electricity-related equipment and auxiliary materials containing flammable substances, which have possibility of causing property damage or casualties due to spread of the fire, explosion or toxic gas release upon the fire break, among the equipment and subsidiary materials that may be present in the region installed with the electrical equipment within the nuclear power plant.

According to one embodiment of the present invention, electric cabinets, electric cables, pipes and the like included in the target object refer to equipment anticipated to undergo primary damage upon the fire outbreak within the nuclear power plant, and may be understood as objects having anticipated damage that is changeable afterward depending on how quickly extinguish fire on the target objects.

According to one embodiment of the present invention, the above-mentioned electrical equipment and electrical lines may include cables, power cabinets, control panels, MCC and the like built to produce electricity within the nuclear power plant. The auxiliary materials containing flammable substances may include transformer oil, lubricants and liquid fuel transformers, combustible gases in generators, battery rooms and storages, and windings, oil and lubricants of a motor. The other subsidiary materials affected by the fire may include insulating materials and covers, general flammables, combustible structures and the like of the pipes and equipment in the electrical equipment.

The present invention will be described with exemplary embodiments based on the electrical equipment cabinets, the electric cables and the pipes. However, the present invention is not limited thereto, and may be understood to include all of the above-mentioned components.

In addition, According to one embodiment of the present invention, the target object may include not only the above-mentioned objects but also objects exerting effects upon the fire outbreak in the nuclear power plant or performing actions to extinguish the fire, and the present invention is not limited thereto.

According to one embodiment of the present invention, the object exerting effects upon the fire outbreak or performing actions to extinguish the fire may include fire detection sensors, fire analysis devices, mist-spray fire extinguishers, hose reel fire hydrants, and electric water guns.

According to one embodiment of the present invention, the digital modeling performed by the digital twin build unit 10 refers to modeling the target object through expression in the form of a two-dimensional or three-dimensional design by a computer in order to provide simulation information 30a described later.

The digital twin build unit 10 may perform modeling regarding information on an appearance and a location of the target object, and convert information including information about type, number, size, length, capacity and the like thereof into digital information, in which the size information and the length information may refer to information containing specific numerical information about sizes and lengths of the target object and a related object, and the capacity information may refer to information about capacity of the target object and electrical equipment of a related object or information about capacity of protective equipment (such as pump).

According to one embodiment of the present invention, the attribute information application unit 20 may apply fire reactivity information, which is information received from an outside and serves as attribute information about a fire outbreak factor and a fire spread factor of the target object, to the initial digital twin, thereby building the digital twin.

According to one embodiment of the present invention, the attribute information about the fire outbreak factor of the target object may refer to attribute information for determining a fire that has occurred due to the fire outbreak factor upon the fire outbreak in the region installed with the electrical equipment within the nuclear power plant, such as fire level, fire suppression difficulty level, fire outbreak region, degree of fire danger, temperature and pressure inside the fire outbreak region, estimated damage degree, installation location, anti-fire equipment required for fire suppression, and personnel scale inside the nuclear power plant.

In addition, according to one embodiment of the present invention, the attribute information about the fire spread factor of the target object may refer to attribute information for determining a spread degree of a fire that has occurred due to the fire spread factor upon the fire outbreak in the region installed the electrical equipment within the nuclear power plant, such as fire spread level, estimated spread time to other regions, estimated suppression time, and suppression limit time.

According to one embodiment of the present invention, the fire outbreak factor and the fire spread factor for determining the attribute information may include a material, flammability of the object, average temperature during operation, average power consumption, power transmission, power generation or energy reserving amounts, type and location of an ignition source and amounts of secondary combustible substances due to flame propagation.

The material of the target object refers to a material of which the object is composed or made, and the type of the ignition source refers to information about which item the ignition source corresponds to in the target object upon the fire outbreak and includes electric spark, heat generation, high-temperature body, flame, and high-temperature combustion gas.

According to one embodiment of the present invention, the simulation information provision unit 30 may generate simulation information 30a, which is information about a fire outbreak prediction, a fire spread simulation upon fire break, and fire response and evacuation scenarios upon the fire break, by using the digital twin according to the user input and output the generated simulation information to a user terminal 20a.

According to one embodiment of the present invention, the above-mentioned simulation refers to a technique that conducts an experiment using a model formed by replicating an actual physical space as a digital model and performs actions or decisions based on a result of the experiment.

According to one embodiment of the present invention, the fire outbreak prediction simulation may derive results, based on the information about the target objects, to indicate objects having possibility of fire outbreak, a fire outbreak probability for each target object, estimated fire outbreak time and region for each target object, estimated fire outbreak causes of the target objects, and estimated risk ranks upon fire outbreak.

In addition, according to one embodiment of the present invention, the fire spread simulation upon the fire outbreak may derive results indicating estimated path, direction and speed of fire spread after the fire outbreak, and a probability of target objects having high spread risk.

According to one embodiment of the present invention, the information about response and evacuation scenarios upon the fire outbreak may derive results indicating a priority of effective fire extinguishing equipment for fire suppression, a suppression priority, effective evacuation methods and routes, and actions and inspections required to be performed after extinguishing the fire.

According to one embodiment of the present invention, the above-mentioned multiple pieces of simulation information are information that may be determined through the attribute information about the target object, and may also be determined based on scales of the nuclear power plant and electrical equipment, and on whether the target object is operating.

According to one embodiment of the present invention, the user terminal 20a collectively refers to a term for a terminal allowed to be accessed by a management entity that operates and manages the nuclear power plant, and may include a personal computer (PC), a laptop, a mobile phone, and the like. The management entity inside the nuclear power plant may be provided with the simulation information through an output as a result of executing an application or as a result of web access, and may be provided with visual data including information such as numbers, graphs and digital modeling for management, inspection and control of the target object using the digital twin and operation state of the nuclear power plant, in addition to the simulation information, through the user terminal 20a.

According to one embodiment of the present invention, the simulation information provision unit, may establish a fire outbreak prediction algorithm for deriving a predicted value for whether a fire occurs in a region based on a result of combining a plurality of sensor values, and generate a fire outbreak prediction simulation for each scenario according to the established fire outbreak prediction algorithm to output the generated fire outbreak prediction simulation to the user terminal.

According to one embodiment of the present invention, a simulation may be performed on the target objects and actual changes of the situation of the nuclear power plant and the electrical equipment inside the nuclear power plant through the digital twin according to various situations occurring due to the fire upon the fire outbreak.

According to one embodiment of the present invention, the digital twin may perform the simulation by using a fire detector for directly detecting a fire. Accordingly, when a fire is detected within the digital twin, a fire outbreak may be determined through a fire detection sensor included in the digital twin.

According to one embodiment of the present invention, other sensors may be used other than the fire detection sensor in order to establish the algorithm for determining whether a fire has occurred. The above-described fire detector may include an air-inhalation detector, and the above-described other sensors may include a temperature sensor, a humidity sensor, a pressure sensor, a smoke sensor, an air quality sensor and the like.

According to one embodiment of the present invention, it can be understood that, when the fire detector included in the digital twin detects the fire upon fire outbreak, result values by the other sensors may be compared and derived values may be combined, so that the algorithm capable of predicting fire outbreak in a specific region may be established.

For example, it may be estimated that a fire has occurred when a numerical value measured by an air quality sensor is higher than or equal to a reference value based on a numerical value of density of particles generated by smoke measured using the air-inhalation detector upon the fire outbreak. In addition, it may be estimated that a fire has occurred when a numerical value measured by a smoke sensor is higher than or equal to a reference value based on a numerical value of scattered light caused by smoke particles measured using the air-inhalation detector upon the fire outbreak. In addition, it may also be estimated that a fire has occurred when values measured using temperature, humidity and pressure sensors are higher than or equal to values measured by the fire detector upon the fire outbreak. Accordingly, when a predetermined number of conditions are satisfied, the fire outbreak determination algorithm capable of determining whether a fire has occurred may be established finally.

According to one embodiment of the present invention, fire detectors, sensors and the like may be located within a predetermined region inside electrical equipment or within a predetermined radius of a target object in order to detect an accurate region of the fire outbreak. In addition, for visual detection, video capture devices may be placed in each region so that the manager can visually check the region, and the present invention is not limited thereto.

According to one embodiment of the present invention, since the digital twin is an advanced simulation device generated by reproducing real objects and situations, to prepare for the case in which a fire occurs in the nuclear power plant, so that a process of detecting and extinguishing the fire can be simulated without experiencing or generating the fire in reality.

According to one embodiment of the present invention, the simulation information provision unit 30 may provide the fire reactivity information by using graphic elements, and aging information about the electrical equipment, aging information about cables, corrosion information about pipes, and information about quantity and aging of storage tanks for storing each nuclear power plant water in the digital twin may be output to the user terminal as the fire reactivity information.

According to one embodiment of the present invention, the graphic elements may include a situation in which a state of electrical equipment in the nuclear power plant including the target object is changed due to the fire outbreak is expressed on the user terminal 20a through digital modeling on the digital twin.

In addition, according to one embodiment of the present invention, the fire reactivity information may include information about corrosion and aging of target objects or facilities s within the electrical equipment and related information such as a presence of a material related to flammable substances, may be expressed in formats such as graphs, charts and numbers when the information is additionally described, and may be provided to include estimated equipment lifespan, inspection dates, and the like in addition to the aging or corrosion information.

Thus, according to the embodiment of the present invention, since the information about the target objects included in the electrical equipment within the nuclear power plant are provided together with the simulation information, states of objects related to a fire may be accurately identified, so that. objective indicators can be established in detecting and responding to the fire, and accordingly, the fire can be detected and responded more effectively.

In addition, according to one embodiment of the present invention, simulated results may be output as other simulated results according to changes in information of target objects, information of related objects, and changes of electrical equipment.

According to one embodiment of the present invention, the system of the present invention further includes a disaster prevention equipment recommendation unit 40 connected to the simulation information provision unit 30 to recommend information about fire extinguishing equipment capable of reducing fire possibility or preventing spread when information about the fire possibility and the spread at a specific point is generated.

According to one embodiment of the present invention, the information about fire possibility and spread at a specific point may refer to a probability or numerical information derived by considering the information about target objects including electrical equipment installed at the specific point, and the aging information and the corrosion information about facilities and the like included when the simulation information is provided.

According to one embodiment of the present invention, the fire extinguishing equipment may include an object for performing the actions for extinguishing a fire. As information about the fire extinguishing equipment, information about type, manufacturer, minimum specification, minimum quantity used, price, effectiveness, and fire extinguishing rate of fire extinguishing equipment, and information about fire extinguishing equipment suitable for a type or level of a fire may be recommended. In addition, the disaster prevention equipment recommendation unit 40 may recommend the top 5 fire extinguishing equipment including the most suitable fire extinguishing equipment.

According to one embodiment of the present invention, the simulation information provision unit 30, when information about the specific point is received as the user input, may provide information about the fire possibility and the spread of the fire based on a size of a region that may be set differently based on attribute information of a region corresponding to the information.

Figure 2:
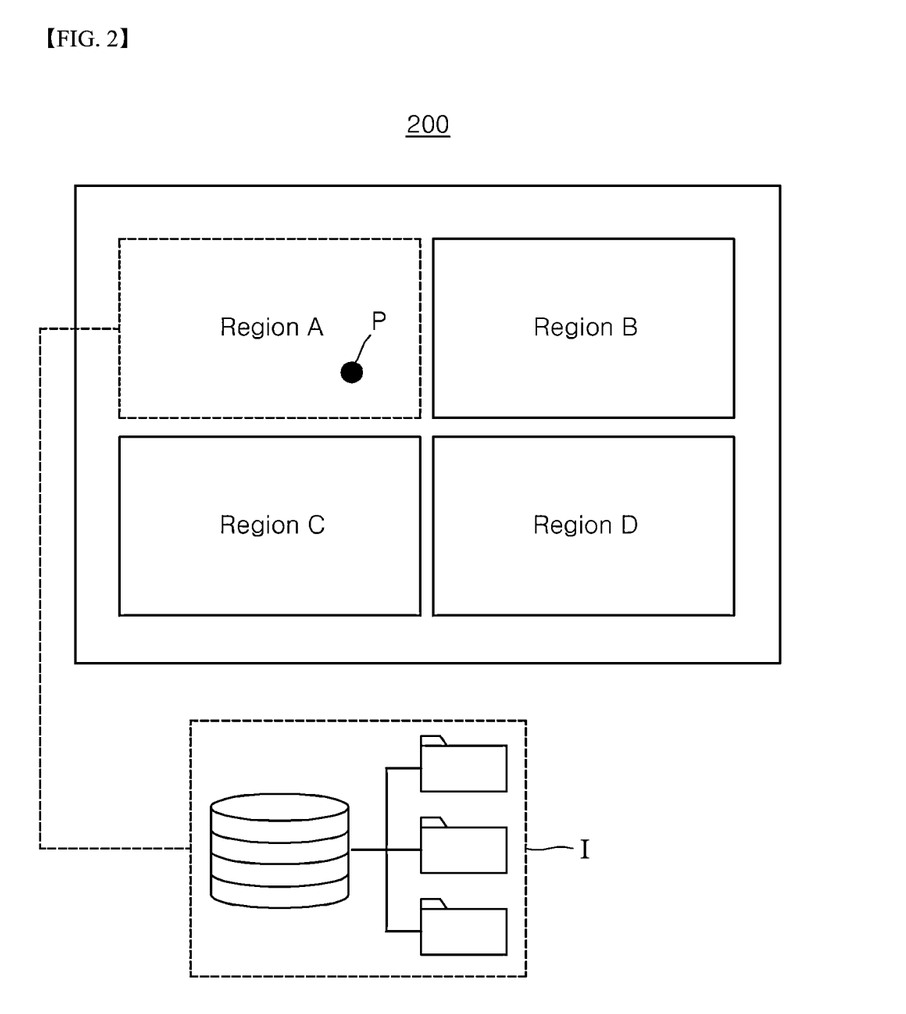
FIG. 2 is an example of a process of deriving attribute information of a region through an interface provided to a user in the digital twin platform provision system for detecting and responding to the fire in the installation region of the electrical equipment in the nuclear power plant according to one embodiment of the present invention.

According to one embodiment of the present invention, referring to FIG. 2, the user may confirm the region installed with the electrical equipment within the nuclear power plant through an interface 200 as shown in FIG. 2. When the user enters information about a specific point P, attribute information I of region A, which is a region containing the specific point P, may be derived.

According to one embodiment of the present invention, the attribute information I of the region may also correspond to boundary information of the region, may include information indicating which region the area is and may include information about location, area, volume and property of the region. The information about the property may include information for recommending or filtering fire extinguishing equipment as described below, and specifically, may include causal information about personnel allowed to access the region, information about number of personnel accessing the region and a plurality of facilities or equipment placed in the region, estimated risk information at the point upon fire outbreak, priority of the region during operation of the nuclear power plant, flammability numerical information derived from material information of target objects and facilities located within the region, information about personnel permitted to access the region, and restricted information about facilities and target objects or equipment allowed to be brought into the region. The causal information about personnel allowed to access the region may be provided such that disaster prevention equipment allowed to be used by personnel having access permission may be installed, and managers or technicians having access permission for the nuclear power plant in addition to firefighters may also use the disaster prevention equipment when the specific point is a region for placing a heavy water reactor for example.

Thus, according to one embodiment of the present invention, the simulation information provision unit 30 may provide information about the fire possibility and the spread of the fire based on the above-described information.

According to one embodiment of the present invention, the above-described size information about the region may be a reference for determining a relative region. For example, the size information may influence determination such that a risk of fire is high because density of target objects and facilities within the region is increased when the region has a size less than or equal to a preset value or relatively smaller than sizes of other regions.

The above-described material information refers to information related to the fact that materials and substances of a target object or facility are formed of flammable materials and may directly or indirectly affect outbreak or spread of a fire within the region.

According to one embodiment of the present invention, based on the above information, the disaster prevention equipment recommendation unit may 40 use attribute information of a selected region to recommend a disaster prevention equipment installed within a relevant critical range.

Thus, according to one embodiment of the present invention, the disaster prevention equipment recommendation unit 40 may consider the number of working and accessing personnel based on the attribute information of the region and recommend disaster prevention equipment that can be or is desirable to be installed within the region based on the size of the region.

As described in the above manner, the disaster prevention equipment recommendation unit 40 may recommend the top 5 disaster prevention equipment including the most suitable disaster prevention equipment.

Figure 3:
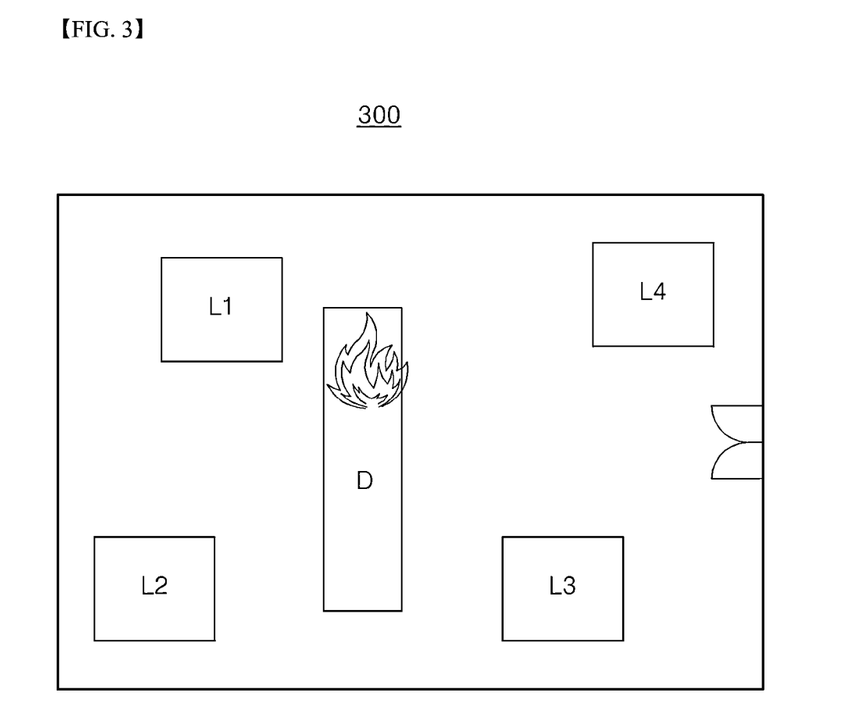
FIG. 3 is an example of an interface that recommends a priority for installing disaster prevention equipment of the digital twin platform provision system for detecting and responding to the fire in the installation region of the electrical equipment in the nuclear power plant according to one embodiment of the present invention.

According to one embodiment of the present invention, referring to FIG. 3, in an interface 300 for recommending a priority for installing the disaster prevention equipment, the disaster prevention equipment recommendation unit 40 may determine and recommend the priority of installation recommendation locations of disaster prevention equipment installation regions L1, L2, L3 and L4 sequentially close to a specific location D in a region having high possibility of fire outbreak.

The specific location D within the region having the high probability of fire outbreak may include equipment generating heat, equipment using a lot of electricity, equipment connected to multiple other equipment and the like, and may correspond to, for example, a location in which electrical terminals, high-temperature electrical equipment cabinets, transformers, and motors are placed.

According to one embodiment of the present invention, the disaster prevention equipment may be installed with priority in a location having a high risk of fire outbreak, so that the possibility of quickly extinguishing the fire upon the fire outbreak can be increased.

Figure 4:
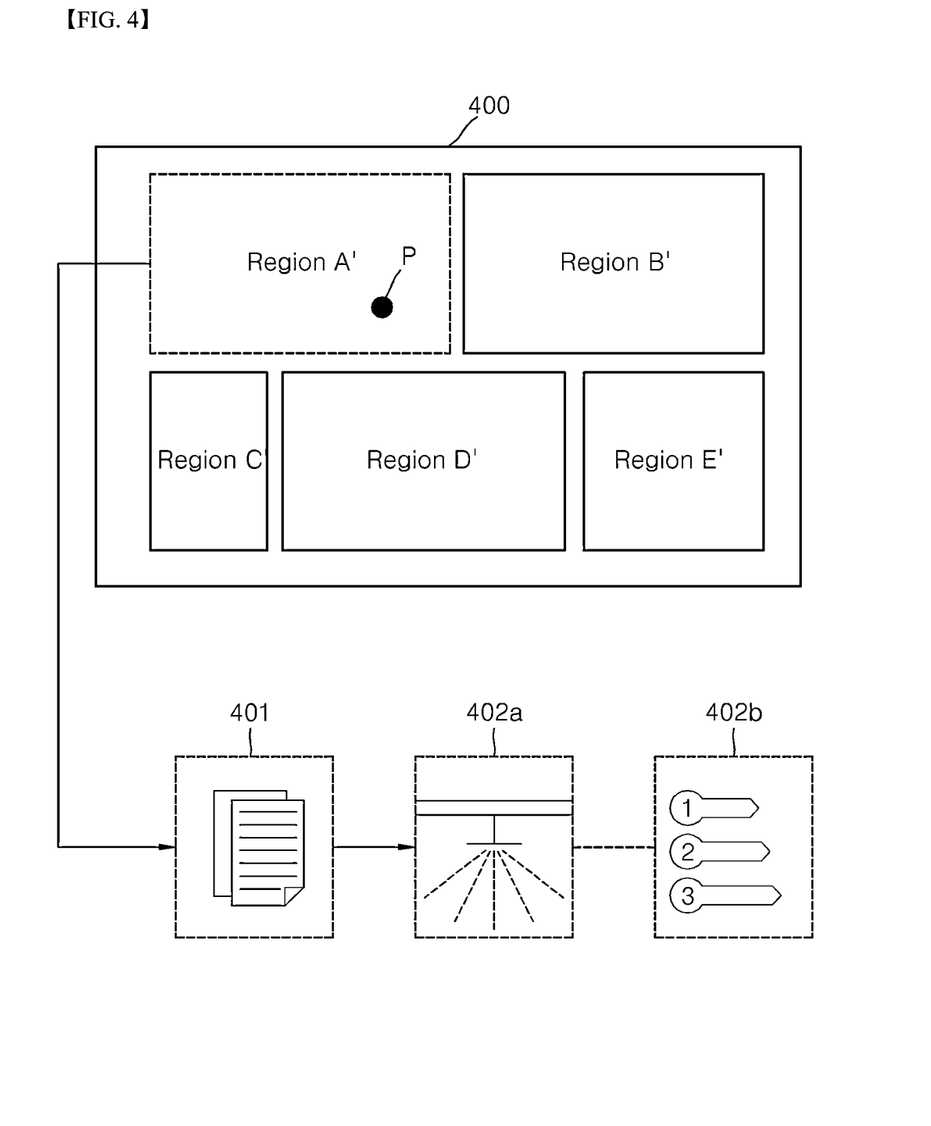
FIG. 4 is an example of a process for recommending a list of suitable disaster prevention equipment in the digital twin platform provision system for detecting and responding to the fire in the installation region of the electrical equipment in the nuclear power plant according to one embodiment of the present invention.

Referring to FIG. 4, FIG. 4 includes a region 400 having electrical equipment in the nuclear power plant includes region A', region B', region C' and region D'. In addition, disaster prevention equipment suitable for region A' is derived. attribute information 401 of region A' may include that, for example, main personnel allowed to access are heavy water reactor managers and technicians, the number of accessing personnel is 30, an estimated risk is 70%, and information such as importance is 908. Since the size of the region corresponds to a medium size, disaster prevention equipment 402a most suitable for region A' and a list of disaster prevention equipment 402b including the disaster prevention equipment 402a may be recommended starting from items with high suitability and provided to the user.

According to one embodiment of the present invention, the disaster prevention equipment recommendation unit 40 may provide changed information about adjustment in a numerical value of the fire probability and the spread upon installation of the recommended disaster prevention equipment by comparing with existing information.

According to one embodiment of the present invention, the simulation may be performed through the digital twin with respect to the case of installing the disaster prevention equipment recommended by the disaster prevention equipment recommendation unit 40, so that changes compared to the existing facility arrangement including visual data may be provided to the user terminal 20a. The visual data may be understood as including numbers, lines, graphs and shapes, and the visual data may be provided by changing colors, dotted lines and display orders to compare the changed information with existing information. In addition, the changed information about adjustment in a numerical value of fire probability and fire spread by comparing with the existing equipment arrangement may be compared using indicators such as information about intensity of fire outbreak, estimated speed and time required for fire suppression, possibility of fire outbreak subject to changes in a state of the target object or environmental state, fire spread region, and fire spread speed.

Figure 5A:
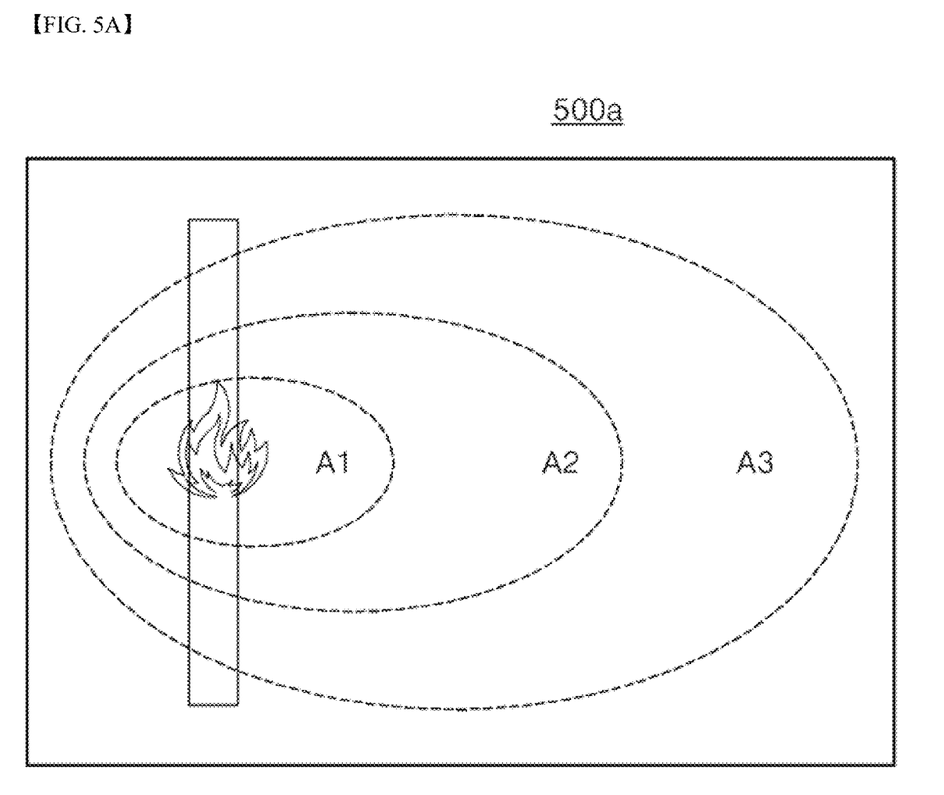
FIGS. 5A and 5B show an example of an interface that provides comparative degrees of fire spread before and after installation of the fire prevention equipment recommended by the digital twin platform provision system for detecting and responding to the fire in the installation region of the electrical equipment in the nuclear power plant according to one embodiment of the present invention.
Figure 5B:
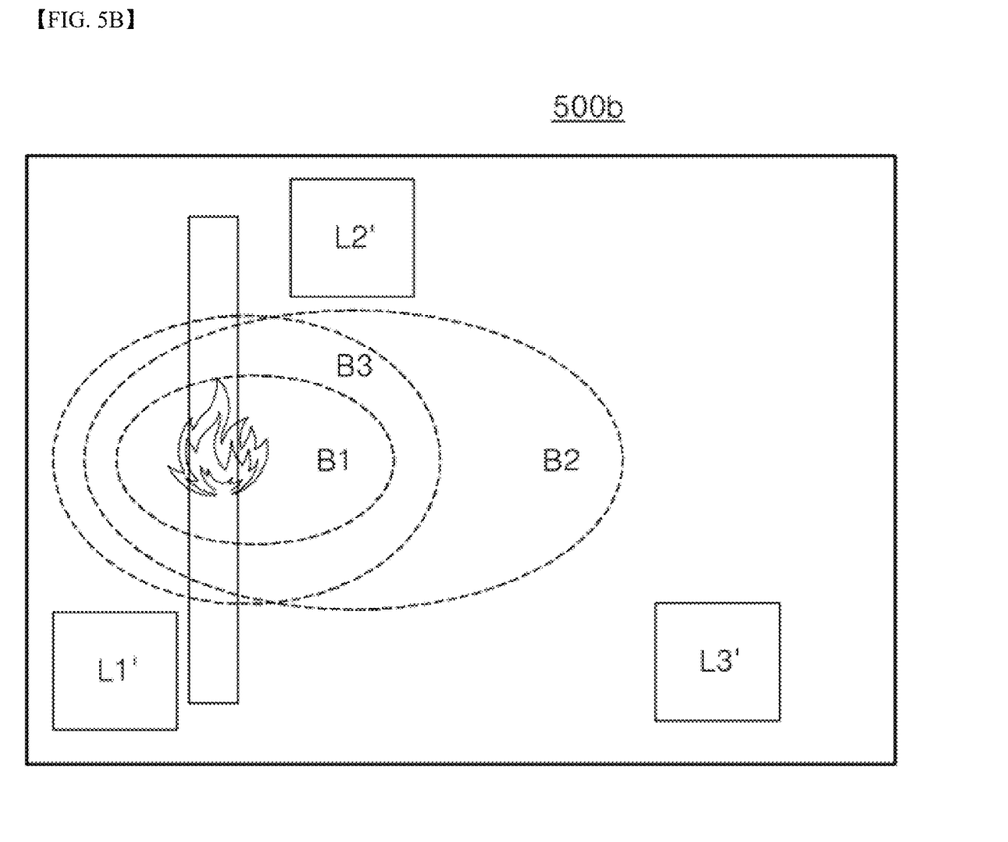

For example, referring to FIGS. 5A and 5B, in an existing arrangement state 500a before installing the disaster prevention equipment, the fire spread region over the time is gradually increased as A1, A2 and A3 after fire outbreak. However, it can be seen that, after the disaster prevention equipment L1', L2', L3' and the like recommended by the disaster prevention equipment recommendation unit 40 is installed, the fire spread region tends to be initially increased to B1 and B2 and then decreased to B3, as a result, the fire spread rate is decreased by about 30% along with the effect of fire extinguishment and suppression.

Figure 6A:
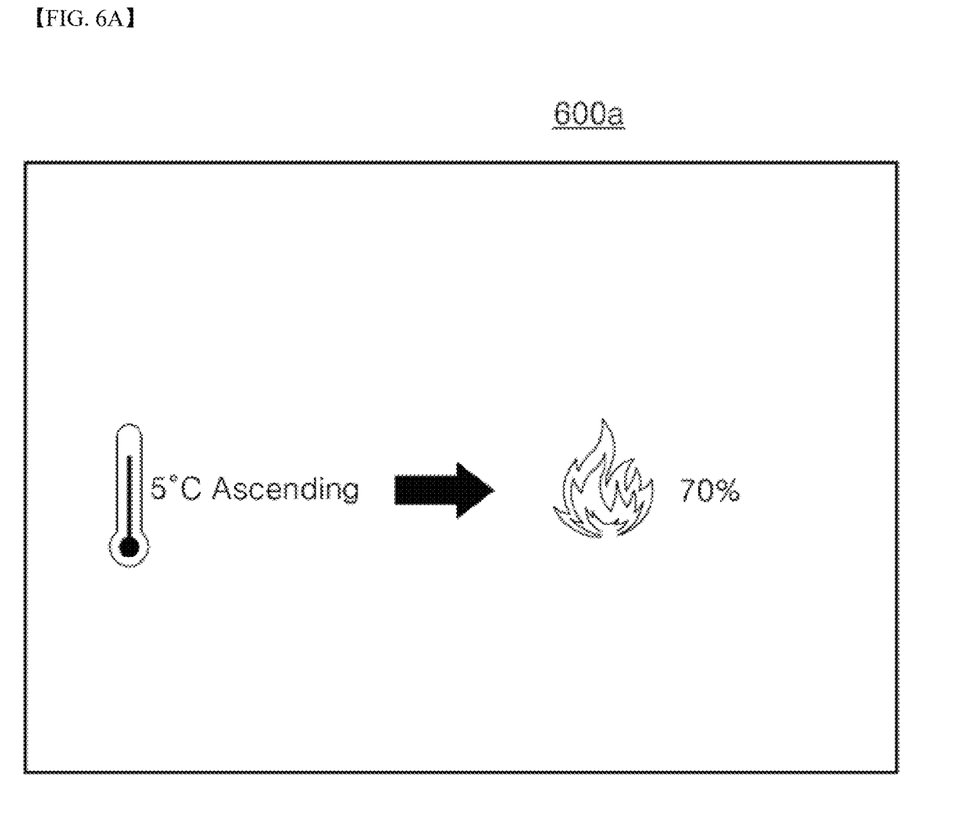
FIGS. 6A and 6B show an example of an interface that provides changes in fire probability before and after installation of the fire prevention equipment recommended by the digital twin platform provision system for detecting and responding to the fire in the installation region of the electrical equipment in the nuclear power plant according to one embodiment of the present invention.
Figure 6B:
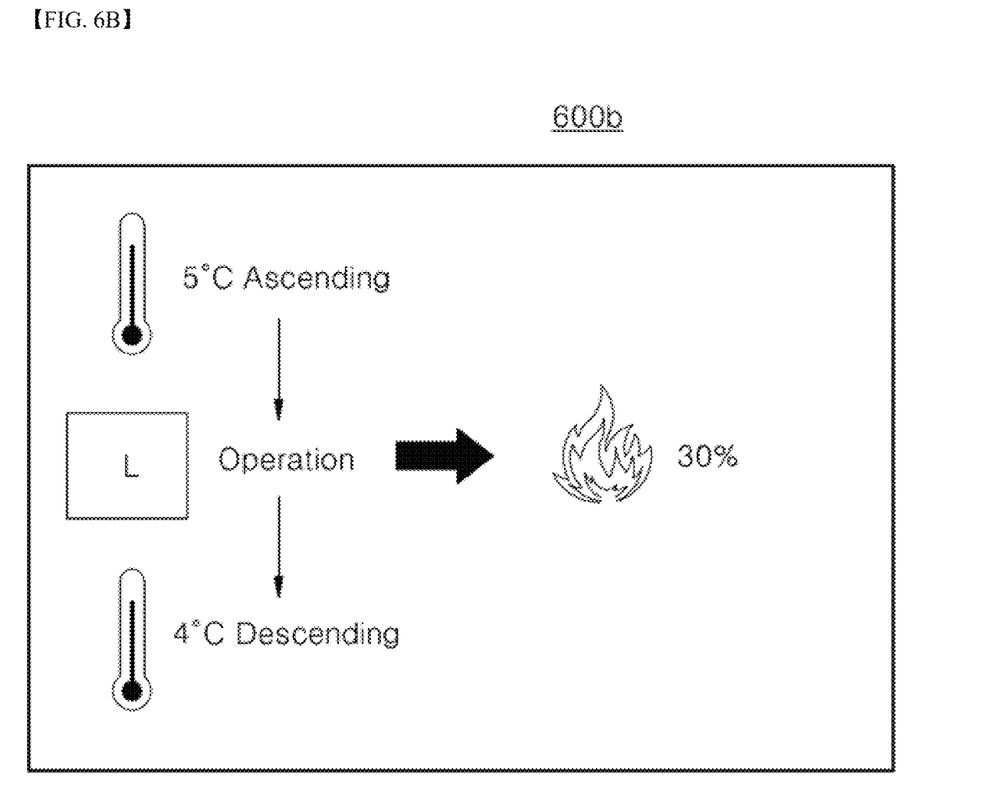

In addition, referring to FIGS. 6A and 6B, a probability of fire outbreak is 70% when a temperature of an internal environment of the nuclear power plant rises to raise a temperature of the target object by 5 degrees, in a state 600a before installing disaster prevention equipment. However, it is confirmed from the simulation results that the possibility of fire outbreak is decreased to 30% by cooling the electrical equipment when a temperature of the electrical equipment rises in a state 600b after installing the disaster prevention equipment recommended by the disaster prevention equipment recommendation unit 40.

According to one embodiment of the present invention, the simulation information provision unit 30 may display evacuation guide line information and fire extinguisher placement information prior to other information when the evacuation scenario information is provided upon the fire outbreak.

The above-mentioned information may be printed and provided in a distinct format so as to be displayed on the interface within the digital twin while being distinguished from the target objects within the digital twin by using lines, arrows, colors, marks and the like.

In addition, a location of protective clothing and a location of first aid kits may be additionally provided in addition to the evacuation guide line information and the fire extinguisher placement information, and the present invention is not limited thereto.

Thus, according to one embodiment of the present invention, workers or managers may respond to an initial fire or provide a suitable evacuation route upon fire outbreak in the region installed with the electrical equipment within the nuclear power plant, so that casualties can be minimized even when the fire occurs in the nuclear power plant.

Figure 7:
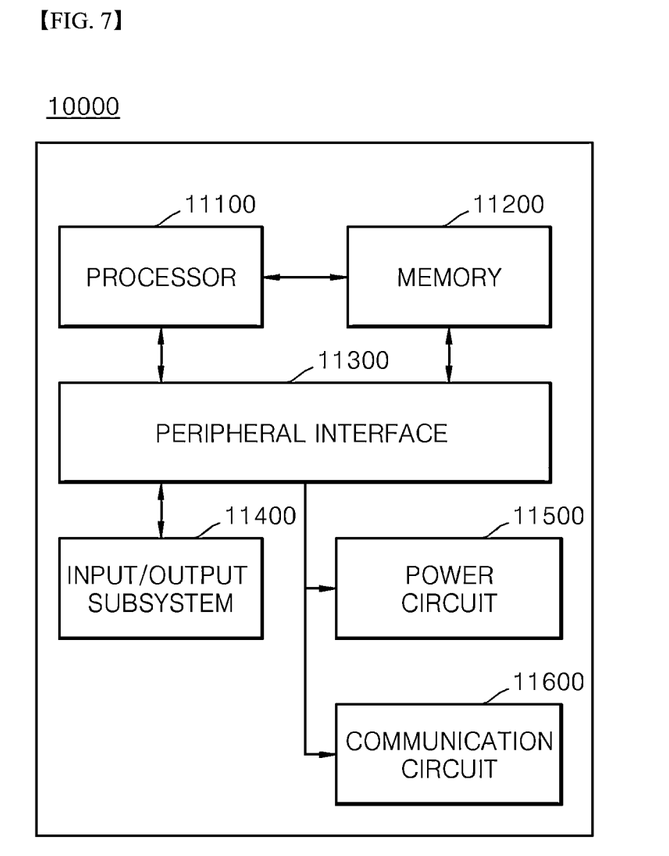
FIG. 7 shows one example of an internal configuration of a computing device according to one embodiment of the present invention.

FIG. 7 shows one example of an internal configuration of a computing device according to one embodiment of the present invention. In the following description, unnecessary descriptions for embodiments redundant with those of FIGS. 1 to 6A and 6B will be omitted.

As shown in FIG. 7, the computing device 10000 may include at least one processor 11100, a memory 11200, a peripheral interface 11300, an input/output subsystem (I/O subsystem) 11400, a power circuit 11500, and a communication circuit 11600. The computing device 10000 may correspond to a user terminal A connected to a tactile interface device or correspond to the above-mentioned computing device B.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 10000.

The access to the memory 11200 from other components of the processor 11100 or the peripheral interface 11300, may be controlled by the processor 11100.

The peripheral interface 11300 may combine an input and/or output peripheral device of the computing device 10000 to the processor 11100 and the memory 11200. The processor 11100 may execute the software module or the instruction set stored in memory 11200, thereby performing various functions for the computing device 10000 and processing data.

The I/O subsystem 11400 may combine various input/output peripheral devices to the peripheral interface 11300. For example, the I/O subsystem 11400 may include a monitor, a keyboard, a mouse, a printer or a controller for coupling a peripheral device such as a touch screen or a sensor to the peripheral interface 11300 as needed. According to another aspect, the I/O peripheral devices may be combined to the peripheral interface 11300 without passing through the I/O subsystem 11400.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or arbitrary other components for generating, managing, or distributing power.

The communication circuit 11600 may use at least one external port to enable communication with other computing devices.

Alternatively, as described above, the communication circuit 11600 may, if necessary, transmit and receive an RF signal, also known as an electromagnetic signal, including RF circuitry, thereby enabling communication with other computing devices.

The above embodiment of FIG. 7 is merely an example of the computing device 10000, and the computing device 11000 may have a configuration or arrangement in which some of the components shown in FIG. 7 are omitted, additional components not shown in FIG. 7 are further included, or two or more components are combined. For example, a computing device for a communication terminal in a mobile environment may further include a touch screen, a sensor or the like in addition to the components shown in FIG. 7, and the communication circuit may include a circuit for RF communication of various communication schemes (such as WiFi, 3G, LTE, Bluetooth, NFC, and Zigbee). The components that may be included in the computing device 10000 may be implemented by hardware, software, or a combination of both hardware and software which include at least one integrated circuit specialized in a signal processing or an application.

Methods according to embodiments of the present invention may be implemented in the form of program instructions to be executed through various computing devices so as to be recorded in a computer-readable medium. Particularly, a program according to the embodiment of the present invention may be configured as a PC-based program or an application dedicated to a mobile terminal. The application to which the present invention is applied may be installed on a user terminal through a file provided by a file distribution system. For example, the file distribution system may include a file transmission unit (not shown) for transmitting the file according to a request of the user terminal.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, one processing device is used in some cases, however, it will be appreciated to those skilled in the art that the processing device may include a plurality of processing elements and/or a plurality of types of processing elements. For example, the processing device may include a plurality of processors or one processor and one controller. In addition, other processing configurations, such as parallel processors, are also possible.

The software may include a computer program, a code, an instruction, or a combination of at least one thereof and may configure the processing device to operate as desired, or may instruct the processing device independently or collectively. The software and/or data may be permanently or temporarily embodied in any type of machine, component, physical device, virtual equipment, and computer storage medium or device in order to be interpreted by the processor or to provide instructions or data to the processor. The software may be distributed over computing devices connected to networks, so as to be stored or executed in a distributed manner. The software and data may be stored in at least one computer-readable recording media.

The method according to the embodiments may be implemented in the form of program instructions to be executed through various computing mechanisms, so as to be recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like, as well as a machine code created by a compiler. The above hardware device may be configured to operate as at least one software module to perform the operations of the embodiments, and vise versa.

The above embodiments have been described with reference to the limited embodiments and drawings, however, it will be understood by those skilled in the art that various changes and modifications may be made from the above-mentioned description. For example, appropriate results may be achieved even though the described techniques may be performed in an order different from the described manner, and/or the described components such as system, structure, device, and circuit may be coupled or combined in a form different from the described manner, or replaced or substituted by other components or equivalents. Therefore, other implementations, other embodiments, and equivalents to the claims are also within the scope of the following claims.

What is claimed is:

1. A digital twin platform provision system, which is implemented by a computing device including one or more processors and one or more memories for storing instructions executable in the processors, for detecting and responding to a fire in an installation region of electrical equipment in a nuclear power plant, the digital twin platform provision system comprising:
  a digital twin build unit configured to build an initial digital twin by digitally modeling target objects serving as objects including equipment and subsidiary materials related to fire outbreak and damage spread in a place installed with the electrical equipment in the nuclear power plant;
  an attribute information application unit configured to apply fire reactivity information, which is information received from an outside and serves as attribute information about a fire outbreak factor and a fire spread factor of the target object, to the initial digital twin, thereby building a digital twin;
  a simulation information provision unit configured to generate simulation information, which is information about a fire outbreak prediction, a fire spread simulation upon fire break, and fire response and evacuation scenarios upon the fire break, by using the digital twin according to a user input and outputting the simulation information to a user terminal; and
  a disaster prevention equipment recommendation unit, connected to the simulation information provision unit, configured to recommend information about fire extinguishing equipment to reduce possibility of fire outbreak or prevent fire spread when information is generated about the possibility and spread of fire at a specific point,
  wherein the simulation information provision unit is further configured to provide information about the possibility and spread of fire based on a size of a region set differently based on attribute information of a region corresponding to the information upon receiving input from the user about the specific point;
  wherein the disaster prevention equipment recommendation unit is configured to: (1) use attribute information of a selected region to recommend available disaster prevention equipment for installation within the selected region; (2) identify and recommend installation locations in regions suitable for installing the disaster prevention equipment, sequentially closer from a specific location in a region that has a high fire possibility; and (3) provide quantitative changes in the possibility and spread of fire if the recommended disaster prevention equipment is installed, compared to current arrangement, using indicators comprising information about intensity of fire outbreak, estimated time and speed to suppress fires, possibility of fire outbreak due to changes in target objects or environmental conditions, location of fire spread, and speed of fire spread.

2. The digital twin platform provision system of claim 1, wherein the target object includes electrical equipment, an electric line, a subsidiary material containing a flammable substance, and another subsidiary material installed in a relevant location and affected by the fire.

3. The digital twin platform provision system of claim 1, wherein the simulation information provision unit is further configured to establish a fire outbreak prediction algorithm for deriving a predicted value for whether a fire occurs in a region based on a result of combining a plurality of sensor values, and generates a fire outbreak prediction simulation for each scenario according to the established fire outbreak prediction algorithm to output the generated fire outbreak prediction simulation to the user terminal.

4. The digital twin platform provision system of claim 1, wherein the simulation information provision unit is further configured to provide the fire reactivity information by using graphic elements, in which aging information about the electrical equipment, aging information about cables, corrosion information about pipes, and information about quantity and aging of storage tanks for storing each nuclear power plant water to the user terminal are output as the fire reactivity information.

5. The digital twin platform provision system of claim 1, wherein the simulation information provision unit is further configured to display evacuation guide line information and fire extinguisher placement information prior to other information when the evacuation scenario information is provided upon the fire outbreak.

* * * * *